US006637089B1

(12) United States Patent
English

(10) Patent No.: US 6,637,089 B1
(45) Date of Patent: Oct. 28, 2003

(54) COMPRESSION SLEEVE PULLER WITH DOUBLE THREAD ENGAGEMENT

(76) Inventor: Richard LeRoy English, 6727 E. Swarthmore Dr., Anaheim Hills, CA (US) 92807

( * ) Notice: Subject to any disclaimer, the term of this patent is extended or adjusted under 35 U.S.C. 154(b) by 0 days.

(21) Appl. No.: 10/119,365

(22) Filed: Apr. 9, 2002

(51) Int. Cl.[7] ............................................ B23D 19/04
(52) U.S. Cl. ........................................ 29/264; 29/237
(58) Field of Search ......................... 29/263, 264, 237, 29/272, 282

(56) References Cited

U.S. PATENT DOCUMENTS

| | | | | | |
|---|---|---|---|---|---|
| 3,579,796 A | * | 5/1971 | Fillion | 29/263 |
| 3,662,451 A | * | 5/1972 | Wagner | 29/237 |
| 3,708,855 A | * | 1/1973 | Whiteside et al. | 29/237 |
| 3,970,336 A | * | 7/1976 | O'Sickey et al. | 29/237 |
| 5,519,929 A | | 5/1996 | Bleckman | |

* cited by examiner

*Primary Examiner*—Robert C. Watson

(57) ABSTRACT

A puller (10) for removing a compression sleeve from a pipe (38) generally comprised of a cylindrical body (24) containing on one end an internal cavity (28) to receive the pipe (38) and an external double thread (30) to engage a compression nut (34) and on the opposite end a threaded through screw (14) entering the cavity (28). A disk (22) attached at one end of the screw (14) bears on the end of the pipe (38) and a torque handle (12) at the other end is used to supply increasing pressure against the end of the pipe (38). The puller (10) is threadably attached to the compression nut (34) placing the pipe (38) into the internal cavity (28) against the disk (22) while the compression sleeve (36) is contained between the compression nut (34) and the puller (10). Turning the torque handle (12) urges the compression nut (34) and the compression sleeve (36) toward the end of the pipe (38) until the compression nut (34) and compression sleeve (36) are freed from the pipe (38).

5 Claims, 1 Drawing Sheet

COMPRESSION SLEEVE PULLER WITH DOUBLE THREAD ENGAGEMENT

CROSS REFERENCES TO RELATED APPLICATIONS

None.

BACKGROUND OF THE INVENTION

1. Field of the Invention

This invention relates to pullers, in particular to compression sleeve pullers having a duality of screw thread engagement and includes method of manufacture.

2. Description of Prior Art

A pipe which contains pressurized fluid may be connected to a valve which is used to dispense the pressurized fluid in a controlled manner. An example is household plumbing lines bringing water into the premises. The individual branches of the plumbing system are routed inside the walls of the house and terminate inside a room such as a bathroom or kitchen. The plumbing lines protrude through the wall far enough to attach a water valve. A common method of attaching and sealing a water valve to a plumbing line is to employ the use of a compression fitting consisting of a compression nut, a compression sleeve and the valve. To install the valve, (1) the compression nut is placed on the pipe; (2) the closely fitting compression sleeve is slipped onto the pipe; and (3) the valve is pushed on and engaged with the compression nut. The nut is then tightened onto the valve to compress the compression sleeve onto the pipe. The compression sleeve creates both a mechanical grip for the valve and a pressure seal for the fluid. Other methods of attaching the valve include: (a) threading the valve into a threaded pipe fitting and sealing the point of attachment with pipe sealant; or (b) soldering the valve to the pipe. When a valve wears out or fails, it must be removed and replaced. This invention applies only to the removal of valves which are attached using the compression sleeve method of attaching and sealing.

When replacing a valve or other device attached to a pressurized pipe by means of a compression sleeve fitting, it is important to remove the old compression sleeve and replace it with a new compression sleeve to ensure proper sealing. Generally, plumbing pipe comprises thin wall copper tubing. This tubing is easily damaged when old compression sleeves are reused because the old sleeve generally must be over-tightened to obtain a seal.

The removal of the old compression sleeve requires specially designed tooling to pull the old sleeve off the copper pipe without damage to the pipe. If the pipe is dented, scratched or deformed, it is generally impossible to reseal with a compression sleeve. This results in the need to replace the damaged pipe or otherwise causes extra work and expense.

Compression nuts used for this application come in two standard thread designs: coarse thread and fine thread. Although both thread designs possess the same inner diameter, two puller tools are required to couple with the differing thread designs. In lieu of two tools, the prior art discloses a single tool which incorporates a removable adapter to change from the coarse thread to the fine thread or vice versa. This type of puller is shown in U.S. Pat. No. 5,519,929 issued to Bleckman. Bleckman discloses a removable threaded adapter which threads to the end of the body of the tool to provide coupling to the alternate thread design.

For example, if the tool is manufactured with the fine thread design at the coupling end, then the adapter is manufactured with a fine inner thread, a stepped down inner portion to match the inner diameter of the tool body, a hexagonal or knurled outer diameter for aid in threading it to the tool body, and a coarse outer thread to mate with the compression nut to be removed. This adapter represents 50% of the utility of the tool and approximately 30% of the total cost of the tool.

The required adapter is easily lost or misplaced. Moreover, the adapter is difficult to find in a plumber's toolbox because of its diminutive size. Also, the use of the adapter increases the length of the tool thereby decreasing its usefulness. Bleckman points out that the longer the tool, the more difficult it is to use in the normal plumbing environment of tight quarters and adjacent obstacles such as pipes, sinks and walls. The disadvantages of the additional removable adapter are significant enough to make the tool as a whole less desirable to both the professional plumber and the handyman.

The Bleckman design also discloses an unnecessarily complex and costly bearing device/alignment plug consisting of a larger diameter cylindrical bearing device stepped down to a smaller diameter, tapered, alignment plug used to center the bearing device to the edge of the pipe. Alignment is necessary to prevent the larger diameter bearing device from catching on the compression sleeve as it passes through. The complexity of the bearing device/alignment plug adds unnecessary cost and size to the tool. It has been discovered that if the tapered alignment plug is eliminated and the cylindrical bearing device is replaced by a relatively thin, loose fitting, rotatable disk, the tool operates perfectly well without the additional alignment plug. It was found that the when the disk encounters the compression ring, it self-centers and passes through with no difficulty. The simple disk comprises only about 2% of the cost of the tool whereas the complex bearing device/alignment plug disclosed by Bleckman comprises about 15% of the cost of that tool. Therefore, by eliminating the adapter and replacing the bearing device/alignment plug with a simple disk, the cost of the tool is reduced by about 43%.

The Bleckman design suffers from the following disadvantages:

(a) the separate adapter which is necessary for the tool to be used for both fine and course compression nuts is expensive;

(b) the separate adapter adds undesirable length to the tool;

(c) the separate adapter is easily lost or misplaced;

(d) the bearing device/centering plug is overly complex and expensive.

Therefore, there is a need for a less complex and costly tool which couples to both fine and coarse threaded compression nuts without the use of an undesirable adapter and operates smoothly without the need for a complicated bearing device/centering plug.

3. SUMMARY OF THE INVENTION

The present invention is a dual thread design compression sleeve puller which fits both coarse and fine threads without the use of an additional adapter. The two threads, coarse and fine, are both cut in the threaded end of the tool so that the tool automatically fits either thread on the compression nut. This overcomes the disadvantages of the thread adapter necessary for prior art and makes the tool more productive and less expensive. It also eliminates the possibility of loss of the adapter. The present invention also eliminates the bearing device/centering plug and replaces it with a simple disk which functions for both purposes.

4. OBJECTS AND ADVANTAGES

It is therefore an object of the present invention to provide a new and useful compression sleeve puller with a double thread engagement. Further objects and advantages of the present invention are as follows:

(a) to provide a puller which threadably couples to compression nuts of either fine or coarse thread design without the use of an adapter;

(b) to provide a tool which does not require the use of an alignment plug for centering on the pipe;

(c) to provide a puller of simple design which is easy to use in tight quarters;

(d) to provide a puller which is durable enough for the professional and inexpensive enough for the handyman or homeowner;

(e) to provide a puller which is easy to attach to the compression nut without the use of tools and supports itself when so attached;

(f) to provide a puller which can be operated simply, quickly and in most cases with one hand;

(g) to provide a puller which can be attached and operated by a person with average skill and strength;

(h) to provide a puller which reduces the time and effort for the removal of compression sleeves and increases productivity; and (i) to provide a method of manufacture which will overcome the limitations and disadvantages of threaded pullers heretofore provided.

REFERENCE NUMBERS IN DRAWINGS

Figure 1:
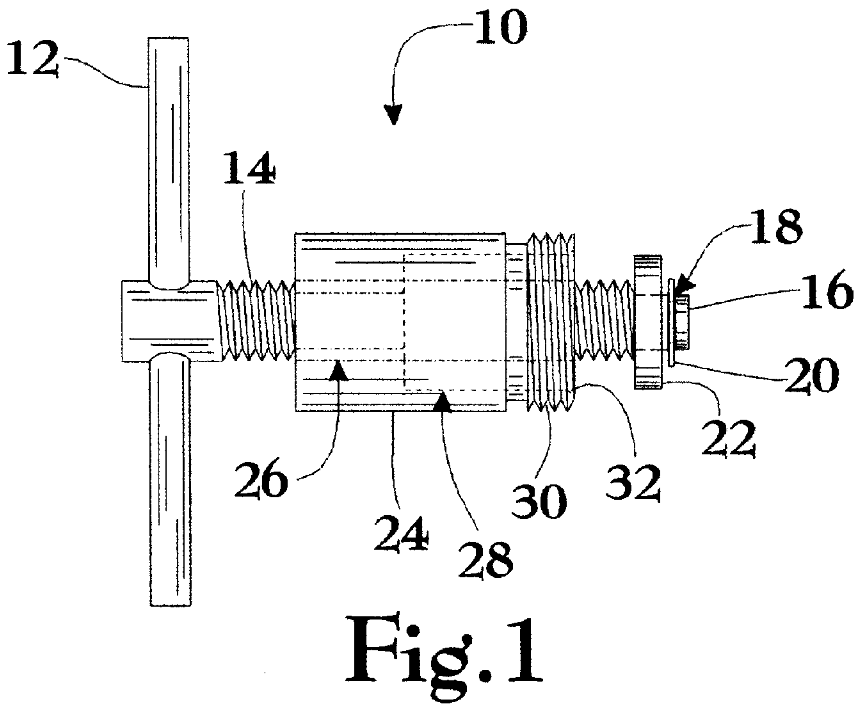
FIG. 1 depicts the preferred embodiment of the puller.

10 compression sleeve puller
12 torque handle
14 screw
16 shaft
18 groove
20 retaining clip
22 disk
24 body
26 internal thread
28 internal cavity
30 external double thread
32 chamfer
34 compression nut
36 compression sleeve
38 pipe

DETAILED DESCRIPTION OF THE PREFERRED EMBODIMENT

Figure 2:
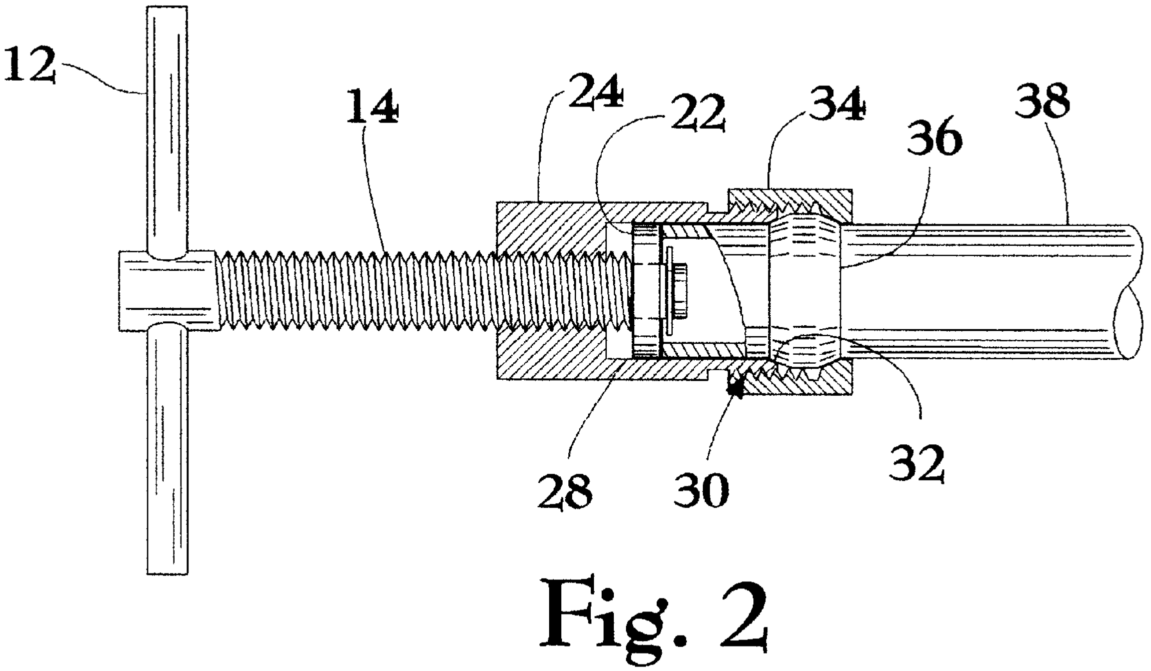
FIG. 2 shows the puller in partial section as typically used engaged with a compression nut, compression sleeve and pipe.

The preferred embodiment of the compression sleeve puller is illustrated in FIGS. 1 and 2. FIG. 1 shows puller 10 composed of a generally cylindrical body 24 with internal thread 26 at one end for threaded engagement with screw 14 and external thread 30 at the opposite end for threaded engagement with compression nut 34 (FIG. 2). Body 24 may be hexagonal or knurled for a better grip. Body 24 has an internal cavity 28 to receive circular disk 22 and an inner chamfer 32 on the open end of cavity 28 to provide a close fit with compression sleeve 36 (FIG.2). Screw 14 has a torque handle 12 fitted on one end and a smaller diameter shaft 16 on the opposite end onto which disk 22 is retained by retaining clip 20 in groove 18. Disk 22 contains a center hole to rotatably mount onto said shaft 16 and has an outside diameter to closely fit into cavity 28 and yet slide easily therein.

FIG. 2 shows puller 10 in partial sectional view attached to pipe 38 by nut 34 which contains a sleeve 36 compressed onto pipe 38 and is to be removed therefrom. Nut 34 is threaded on to thread 30 thereby holding pipe 38 tightly against disk 22. The rotatable mounting of disk 22 allows for reduced effort when handle 12 is turned forcing disk 22 against the end of pipe 38. Disk 22 does not rotate against the end of pipe 38 where the contact diameter is relatively large but instead rotates against screw 14 where the contact diameter is small thus reducing the effort needed to turn handle 12. Cavity 28 is slightly more than ⅝ inch deep which is enough to contain the thickness of disk 22 and to receive pipe 38 engaged fully up to the position of sleeve 36. The inner diameter of cavity 28 is just over ⅝ inch and is closely dimensioned to the outside diameter of pipe 38 for a slidable fit. Screw 14 is approximately two inches in length and is long enough to contain handle 12 and shaft 16 and capable of advancing far enough to push disk 22 at least ⅜ inch beyond the end of cavity 28 so that it passes completely through sleeve 36. As screw 14 is turned using handle 12, disk 22 advances against the end of pipe 38 and urges it out of cavity 28. Screw 14 is further turned urging pipe 38 through sleeve 36 freeing sleeve 36 from pipe 38. The various components of puller 10 are made of stainless steel to resist corrosion and for easy cleaning and long life.

To illustrate one important aspect of this invention, attention is given to the particular case of copper plumbing commonly used for distributing and dispensing water throughout a standard residence or business. Copper plumbing is comprised of copper tubing with an inner diameter of ½ inch and an outer diameter of ⅝ inch. Water control valves and compression nuts used with compression fittings on this size pipe come in two thread designs: fine pitch and coarse pitch. The fine pitch thread is a 13/16-18 NF thread hereinafter referred to as fine thread, and the coarse pitch thread is a straight pipe thread, ½-14 NPS hereinafter referred to as coarse thread. These two threads are of substantially identical diameters. A threadably engaging puller may be manufactured with either a coarse thread or a fine thread in which case two tools, or at least a tool with a relatively expensive adapter, are required to fit all possible jobs of this pipe size. It is an object of the invention to have a single tool which fits both thread designs and is simple and inexpensive. In an effort to do this, two discoveries were made. First, it was discovered that a fine thread may be cut over a coarse thread (or alternatively a coarse thread over a fine thread) resulting in a "single entry, double pitch thread" which will fit both fine thread and coarse thread compression nuts. The discovery of the double thread enhances the utility of puller 10 and eliminates the need for a separate adapter. It was also found that a simple disk 22 may be used in place of the more complicated and costly bearing device/alignment plug used in the prior art.

In the preferred embodiment, thread 30 is a single entry, double pitch thread which engages with compression nut 34 whether it has a coarse thread or a fine thread. This double thread 30 may be manufactured by first cutting a fine thread (13/16-18 NF) on body 24 and carefully noting the entry point of the thread. Then, using the same entry point, a coarse thread (½-14 NPS) is cut on body 24 directly over said fine thread resulting in double thread 30. The second thread will clear a path for itself through the pattern of the first cut thread. Since both threads start at the same entry point, a fine thread compression nut or alternatively a coarse thread compression nut each start threading on at the same entry point and automatically find their own path on double thread 30. Since the fine and coarse threads have different pitches, they will intersect every few turns and result in areas where the major diameter of one thread is cut away to provide for the minor diameter of the other. The appearance of the resulting double thread is a bifurcated look but operates perfectly well for both compression nuts, fine or coarse. Some material is removed from the thread in the process of double threading so the ultimate strength of each of the two threads is reduced. However, each thread is of sufficient strength for removing even the tightest compression sleeves. In addition, the first two or three turns of said double thread are substantially whole, so its strength for use on this tool is more than adequate. Because of the geometry of nut 34 and sleeve 36, puller 10 will engage nut 34 by fewer than three turns before bottoming out against sleeve 36. The strength of the engaged threads is only slightly reduced from that of a standard coarse thread or fine thread. In the preferred embodiment, the thread 30 of puller 10 is steel while the thread of nut 34 is generally brass so that even the reduced strength of thread 30 is substantially greater than the strength of the thread of nut 34. Testing shows that even corroded and overly compressed sleeves 36 are easily removed with puller 10. Although an illustration herein cites the use and design of puller 10 specifically for ½ inch copper pipe, it is in no way intended to limit the use of said puller to that particular use. It is to be noted here that puller 10 may be scaled to larger or smaller pipe applications without changing the spirit or intent of the invention.

OPERATION

Puller 10 is used after a water valve is removed from pipe 38 and the compression nut 34 remaining on the pipe is retained by a compression sleeve 36. Puller 10 is operated as follows: (a) prepare puller 10 by turning handle 12 counter clockwise until disk 22 is drawn as deeply as possible into cavity 28 (b) hand tighten external double thread 30 to nut 34 on pipe 38 (c) turn handle 12 clockwise until disk 22 pushes pipe 38 completely through sleeve 36 freeing nut 34 and sleeve 36 from pipe 38 (d) discard compression nut 34 and compression sleeve 36.

CONCLUSIONS, RAMIFICATIONS AND SCOPE

From the foregoing description it is seen that the invention provides an extremely simple, efficient, low cost and reliable manner for removing compression sleeves from pipes.

While in the foregoing there have been set forth the preferred embodiment of the invention, it will be appreciated that the details herein given may be varied by those skilled in the art without departing from the true spirit and scope of the appended claims.

Thus the scope of the invention should be determined by the appended claims and their legal equivalents, rather than by the examples given.

I claim:

1. A tool for the removal of a compression sleeve from a pipe using the threads on the compression nut as a means to grip said nut and pull said nut and said compression sleeve off said pipe comprising:

a cylindrical body possessing a first end and a second end;

a recessed cavity with an inner diameter greater than said pipe and a depth sufficient to accept said pipe up to said compression sleeve located at said first end of said cylindrical body;

a centered hole at said second end of said cylindrical body;

said centered hole possesses an inner thread to accept an advancing screw;

said first end of said cylindrical body possesses an external thread to engage said compression nut;

a screw possessing a first end and a second end passing through said hole in said second end of said cylindrical body such that said first end of said screw advances into said cavity of said cylindrical body and longitudinally through said cylindrical body;

a smaller diameter shaft attached at said first end of said screw with a groove therein;

a torque handle attached at said second end of said screw to provide turning force on said screw;

a disk slidably and rotatably attached to said shaft at said first end of said screw within said cylindrical cavity; and a clip attached to said groove on said shaft to retain said disk.

2. A tool for the removal of a compression sleeve from a pipe using the threads on the compression nut as a means to grip said nut and pull said nut and said compression sleeve off said pipe comprising:

a cylindrical body possessing a first end and a second end;

a recessed cavity with an inner diameter greater than said pipe and a depth sufficient to accept said pipe up to said compression sleeve located at said first end of said cylindrical body;

a centered hole at second end of said cylindrical body;

said centered hole possesses an inner thread to accept an advancing screw;

said first end of said cylindrical body possesses a double external thread to engage compression nuts possessing either coarse threads or fine threads;

a screw possessing a first end and a second end passing through said hole in said second end of said cylindrical body such that said first end of said screw advances into said cavity of said cylindrical body and longitudinally through said cylindrical body;

a smaller diameter shaft attached at said first end of said screw with a groove therein;

a torque handle attached at said second end of said screw to provide turning force on said screw;

a disk slidably and rotatably attached to said shaft at said first end of said screw within said cylindrical cavity; and a clip attached to said groove on said shaft to retain said disk.

3. The tool in claim 2 wherein said double external thread comprises 13/16-18 NF thread and ½-14 NPS thread.

4. The tool of claim 1 or 2 wherein said torque handle is slidably attached to said screw.

5. The tool of claim 1 or 2 wherein said tool is manufactured from stainless steel metal.

* * * * *